United States Patent

[11] 3,588,899

[72] Inventor Raymond Strauch
    Viroflay, France
[21] Appl. No. 758,882
[22] Filed Sept. 10, 1968
[45] Patented June 28, 1971
[73] Assignee U.S. Philips Corporation
    New York, N.Y.
[32] Priority Sept. 11, 1967
[33] France
[31] 120554

[54] MEASURING DEVICE FOR EXAMPLE,
    FREQUENCY-MODULATION RADIO ALTIMETER
    5 Claims, 1 Drawing Fig.
[52] U.S. Cl. .................................................. 343/14
[51] Int. Cl. ................................................. G01s 9/23
[50] Field of Search .......................................... 343/14, 13,
    17.2, 12 (A)

[56] References Cited
    UNITED STATES PATENTS
    3,229,286  1/1966  Samuel et al. ............... 343/14
    3,349,393 10/1967  Hughes ........................ 343/14
    3,362,024  1/1968  Badewitz ...................... 343/14X Primary Examiner—Rodney D. Bennett, Jr.
Assistant Examiner—Joseph G. Baxter
Attorney—Frank R. Trifari ABSTRACT: A frequency modulated, continuous wave radio altimeter with means for automatically adjusting linear and nonlinear feedback circuits controlling the amplitude and frequency of triangular modulating wave signals used in range measurements during programmed calibration time periods that are interposed between operational time periods when range measurements are made. The signals transmitted to and received from a target during the measuring periods are passed through a known delay line during the calibration periods to make these adjustments which are maintained during the subsequent measurement period.

PATENTED JUN28 1971  3,588,899
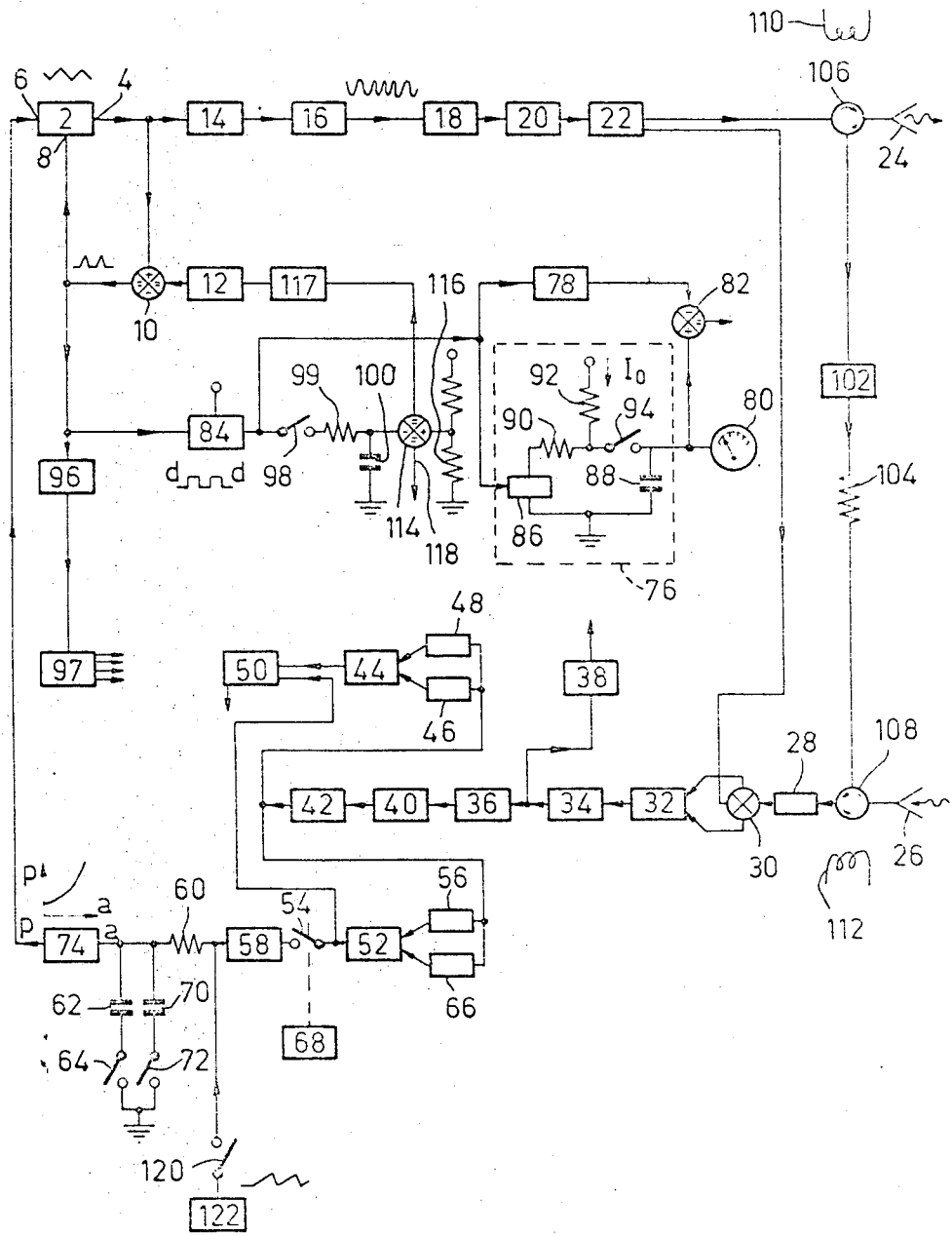
INVENTOR.
RAYMOND STRAUCH
BY
Frank R. _____
AGENT

MEASURING DEVICE FOR EXAMPLE, FREQUENCY-MODULATION RADIO ALTIMETER

The invention relates to an altimetric device transmitting a continuous signal linearly modulated in frequency by means of a sawtooth generator, the echo signal being mixed in a mixing device with the instantaneous transmitted signal for obtaining a difference frequency, which is fed to a discriminator the output voltage of which has an amplitude proportional to the frequency difference between a given fixed frequency and the difference frequency, said output voltage being applied through a first integrator to a sawtooth generator for controlling the slope of the sawtooth voltage so that the duration of a period of this voltage is varied, resulting in a constant difference frequency, whilst a delay member having a constant delay time and means for measuring and indicating the duration of the period of the sawtooth voltage are provided, said duration being a measure for the measured altitude.

This device is particularly suitable for use on board of airplanes. A similar device is described in American Patent Specification No. 3,229,286.

The device is based on the following principle:

A modulator T of variable repetition frequency produces a periodic electric signal U of constant amplitude S and of symmetrical or nonsymmetrical sawtooth waveform. This signal modulates the very high frequency $f=f_m+K_2U$ of a radio transmitter.

The wave continuously transmitted towards the earth is reflected thereby. It is mixed upon return with a fraction of the wave transmitted at the instant of return and having a different frequency. The frequency $f_b$ of the differential beat signal has a value:

$$f_b = \frac{2S}{T} K_2 \tau$$

except around the modulation peaks and when the sawtooth is symmetrical, in which equation $\tau$ designates the duration of the double path of the wave equal to $2d/c$, wherein $d$ is the altitude to be measured and $c$ is the speed of propagation of the wave. This beat frequency $f_b$ is compared with an invariable reference frequency $f_o$ and an error signal proportional to $f_b-f_o$ controls the repetition period T so that these frequencies are maintained equal. It is important especially in the case of abnormal propagation conditions for the receiving circuits to operate on a frequency $f_b$ varying around a fixed frequency within a narrow band. The altitude may be measured in various ways, for example, by means of the period T, which is proportional thereto.

With devices such as aeronautic radio altimeters safety is essential. It is therefore common practice to use internal checking members. Various devices have been proposed, which are all based on the following principles:

a. a permanent check of given links of the measuring circuit by checking the quality of the signals supplied by given critical members; for example, the power and the transmitted spectrum are checked;

b. a calibration of one of the parameters determining the precision, for example, the sweep of the fixed frequency by means of an internal delay line;

c. an overall check of the amplification of the receiving circuit by the check of given parasitic signals inherent in altimetric bearings, for instance, the amplitude-modulation noise, the aerial coupling signal or the signals reflected by the aerials;

d. a doubling of given members (for example, the frequency counter or the output stage) in which the correspondence between the input and output magnitudes in a large dynamic range is essential for the precision of the measurement.

A comparison device checks, in general, the coincidence of the characteristics and actuates the alarm in the event of deviations exceeding the tolerances.

e. finally the aforesaid permanent checking means are accompanied by a manual check intended to replace an internal delay line in the external measuring circuit passing through the aerials During this manual check all measuring and reading circuits are verified, but the measurement of the altitude is thus interrupted for a period of the order of one second: this manual check has therefore necessarily to be carried out at a great altitude, which reduces its utility.

The devices of this design are very complicated and are little suitable for use of square-wave signal circuits, which reduces their reliability.

The invention enhances the precision of the measurement by providing a compensation for the circuit magnitudes varying with time by means of correcting members for such an adjustment of the amplitude of the sawtooth voltage during calibration in which the transmitted signal is applied via the delay member to the mixing device, the fixed delay time of which member corresponds to a given standard altitude, that the duration of a period of the sawtooth voltage corresponds to the value associated with the standard altitude and otherwise by improving the circuit to the optimum so that variations of the altitude to be measured are most rapidly followed by the measuring system and locking the circuit after calibration as soon as possible at the value to be measured which is achieved by including a quadripole whose output voltage varies exponentially with the input voltage in the circuit between the output of the first integrator and the sawtooth generator.

With reference to the accompanying drawing a measuring device embodying the invention will now be described by way of nonlimiting example. The means to be used for obtaining this embodiment have to be considered to form part of this invention, within the scope of which other equivalents may also be employed.

The drawing only shows the elements required for a good understanding of the invention. The FIGURE shows the block diagram of an aeronautic radio altimeter according to the invention.

The FIGURE shows a triangular-signal generator 2 supplying at its output 4 a periodical symmetrical or nonsymmetrical sawtooth signal and having two inputs 6 and 8.

The input 6 serves to control the period T of this signal, whereas the input 8 is used to control the amplitude S, which has in principle a constant value $S_o$. The generator 2 may be of the type referred to in the aforesaid American Patent Specification. It may also be formed either by a single linear integrator of the Miller-type in the case of a nonsymmetrical sawtooth or by two linear integrators of the Miller-type in the event of a symmetrical sawtooth, one integrator supplying a linearly increasing voltage for half a period and the other supplying a voltage decreasing with the same rate during the other half period, which two nonsymmetrical sawtooth signals are added in a suitable element to form the symmetrical sawtooth signal appearing at the output 4. The latter signal will herein be termed the "sawtooth." The height of the peaks of the sawtooth signals is determined by pulses received at the input 8 and provided by a discriminator 10, which receives on the one hand the sawtooth and on the other hand a continuous threshold voltage supplied by a member 12, termed herein briefly "threshold." As soon as the increasing sawtooth reaches and exceeds the threshold voltage the discriminator 10 supplies a pulse which brings about the decrease of the sawtooth. The latter can therefore not exceed the value S of the threshold voltage. Since it is otherwise limited below by the earth potential or zero potential, the value S of the threshold voltage is also the amplitude of the sawtooth.

The input 6 controls the slope of the sawtooth and hence the period T, since the amplitude S maintains approximately a constant value $S_o$.

The generator 2 controls the frequency of an oscillator 14, which is variable between 264 and 272 Mc/s according to the relation: $f=f_m+K_2U$, mentioned above.

The output signal has a power of 5 W. A series of four doublers 16, 18, 20, 22 multiplies the frequency by 16. The signal then arrives at a transmitting aerial 24, which emits the signal towards the ground in the form of a radio-electric wave.

This wave is reflected by the ground and arrives at a receiving aerial 26 with a delay τ with respect to the instant of transmission, which delay is proportional to the height of the airplane.

The received signal is passed through an ultra high-frequency filter 28 and applied to the input of a symmetrical mixer 30. At the other input the mixer receives a small fraction of the transmitted signal from the doubler 22. The output signal of this mixer is formed by the beat frequency signal.

$$f_b = \frac{2S}{T} K_2 \tau$$

which is approximately 25 kc./s. It is this beat signal which is employed as described above.

It is passed through a high band-pass filter 32, which eliminates the frequencies below 15 kc./s. and subsequently amplified at 34 and clipped at 36 so that the value of the short high-power parasitic signals is minimized, which may be produced with frequencies of about 25 kc./s. and can therefore not be eliminated by simple filtering. For this purpose the amplifier 34 has a sufficiently wide passband (500 kc./s.) so that it does not markedly raise these short signals, the relative value of which is strongly reduced by clipping at 36 to a level near the mean amplitude of the useful signal (of the order of 100-times the amplitude of the noise accompanying this signal).

The signal amplified at 34 arrives on the other hand at a level detector 38, which ensures that the power of the signal remains within the normal limits. The signal clipped at 36 arrives at a filter 40, which passes the useful frequency band between 15 and 35 kc./s. The signal is again clipped at 42, this time to a very low level of the order of the noise level. This second clipping process serves to impart to the signal a well defined power without changing appreciably the form of its frequency spectrum at least within the useful band. It is this form of the spectrum which is used in the next members.

A contrast detector 44 compares the powers received in two adjacent bands corresponding to the frequency intervals of 22 to 28 kc./s. and 28 to 34 kc./s. respectively, which powers arrive via the two passband filters 46 and 48 respectively, which determine these two bands. It is thus indicated whether a spectrum is concerned which is concentrated in the band around 25 kc./s., corresponding to the normal operation of the apparatus or whether the spectrum is insufficiently differentiated, which may occur when the received signal is essentially formed by the noise inherent in any electronic apparatus.

In the case of a power ratio between 22—28 kc./s. and 28—34 kc./s. below an appropriate threshold, which may be of the order of 2, the detector 44 actuates on the one hand the alarm system of the apparatus which indicates that the measure is not reliable and on the other hand it interrupts the normal operation of the apparatus and actuates a searching system which will be described hereinafter. These two operations are carried out by means of a logical circuit 50, which introduces a delay of half a second, which means that it responds only when the ratio concerned remains below the said threshold for at least said period of time. It has to be avoided that the reception of a short parasitic signal should result in a premature interruption of the normal operation of the apparatus. On the other hand, when the ratio concerned becomes again higher than the said threshold, that is to say, when normal operation is possible, the circuit 50 immediately stops said two activities.

The output signal of the clipper 42 is supplied on the other hand to a difference detector 52, which compares the powers corresponding to the two halves of the used band between 15 and 25 kc./s. and between 25 and 35 kc./s. These powers arrive through the passband filters 56 and 66 respectively defining these halves. The detector 52 provides a continuous signal proportional to the difference between these powers. This signal is zero when the spectrum of the beat signal is approximately symmetrical to a maximum of 25 kc./s. and increases positively or negatively when this maximum deviates from this frequency, in accordance with the sense of this deviation. The signal is applied to the logical circuit 50, which responds when the signal is higher than a fixed threshold in the same manner as when the signal supplied by the contrast detector 44 has an abnormal value. On the other hand it forms the error signal of the control-loop, the last elements of which will now be described:

This loop is closed by the interruptor 54, controlled by a circuit 68, which receives the signals supplied by other circuits, particularly from the logical circuit 50, one of tee functions of which is, as stated above, to open the loop ensuring the operation of the apparatus, when the operation can no longer be normal in accordance with the indications of the detectors 44 and 52.

After the interruptor 54 the error signal arrives at the amplifier 58 of the saturated type so that the output signal thereof does no longer increase when the input signal increases in excess of the limit which it does not normally transgress.

The output signal of the amplifier 58 is integrated in the circuit formed by the resistor 60 and the capacitor 62. The latter is provided with an interruptor 64, which is closed during the normal operation of the apparatus. When it is opened, the instantaneous value of the output signal of the amplifier 58 is stored in a memory. A further capacitor 70, provided with a switch 72, permits of storing various values of this signal corresponding to special conditions, which will be explained hereinafter.

The error signal then arrives at a nonlinear element 74. The output signal of the nonlinear element finally arrives at the input 6 of the triangular-wave generator 2 and thus controls the flank of the sawtooth and hence the frequency $f_b$ of the differential beat signal, which is thus maintained approximately equal to the reference frequency $f_0=25$ kc./s. as is indicated above.

The function of the nonlinear element 74 in the said control-loop may be explained as follows:

The input signal is designated by $a$ and the output signal by P. P is a nonlinear function of $a$. It will now be examined which has to be this function for an optimum operation of the loop. All members of the loop with the exception of the nonlinear element respond linearly, which means that their useful output magnitude is a linear function of the input magnitude, at least when these magnitudes do not deviate excessively from the value of equilibrium. The slope of the sawtooth furnished by the generator 2 varies linearly with P, which may be described, when Q is the value of said slope and $K_1$ is a constant;

$$Q = K_1 P$$

as well as the variation rate $V = df/dt$ of the frequency transmitted by the aerial 24 as a linear function of the slope of the sawtooth:

$V = K_2 Q$, wherein $K_2$ is a further constant.

The beat frequency $f_b$ is a linear function of the rate V:

$$f_b = V\tau$$

wherein τ is, as stated above, the duration of the double travel of the wave, which duration is not constant, but independent of the magnitudes appearing in the loop.

It will be assumed that this loop is interrupted from the mixer 30 or from the clipper 42 (which is the same because the magnitude appearing at these points of the loop is the same, i.e. the differential beat frequency $f_b$) up to the nonlinear element 74.

The amplification of this interrupted loop is:

$$\frac{df_b}{da} = K_1, K_2 \tau \frac{dP}{da}$$

It will be obvious that the satisfactory operation of the closed control-loop with respect to stability and response rate corresponds to a given value of the amplification of part of the loop. The function $P(a)$ has therefore to be chosen so that $\frac{df_b}{da} = C$, wherein C is a constant.

Taking into account that $f_o$ remains nearly equal to $f_o$, when the control loop operates satisfactorily & so that approximately the following relation between P and $\tau$ is obtained $$f_o = K_1 \cdot K_2 \tau P$$

it can be easily found mathematically that P has to be an exponential function of $a$:

$$P(a) = P_o \exp \frac{Ca}{f_o}$$

wherein $P_o$ is a constant.

The nonlinear element 74 is therefore designed to satisfy this function at least approximately. Those skilled in the art are capable of constructing circuits performing various functions, for example, in the form of a network of resistors and diodes; this construction will not give rise to particular difficulties.

Now the members allowing the measurement of the altitude with the aid of the said control-loop will be described. As stated above, this altitude is proportional to the duration $\tau$ of the double travel of the wave transmitted by the aerial 24 towards the ground and received back by the aerial 26; the control-loop renders the period T of the sawtooth of the generator 2 proportional to said duration $\tau$. Finally the period T is measured. For this purpose the pulses furnished by this discriminator 10 are employed. One function thereof is set out above: initiating once in each period of the descending flank of the sawtooth, when the latter has reached the maximum amplitude chosen. The repetition period of these pulses is T, which is measured by two periodometers 76 and 78, connected in parallel for safety reasons. The output signal of the periodometer 76 is read by a reading member 80. It is compared at 82 with the output signal of the periodometer 78. If the assessed difference is too great, the comparing member 82 actuates an alarm system.

The pulses from the discriminator 10 are not applied directly to the periodometers 76 and 78; they are previously calibrated by a circuit 84, termed "shaper" in order to ensure precision operation of these periodometers. For each of the pulses received this "shaper" provides a square-wave pulse of invariable duration $d$ of an amplitude equal to the supply voltage $V_o$.

On account of this calibration the determination of $1/T$ could be made by determining the mean value of the output signal of the shaper 84. The periodometer 76, however, uses only the duration calibration: it measures the ration $T/d$. It includes an electronic switch 86, which is closed for the duration of the calibrated pulses, a capacitor 88, discharged by said switch through a resistor 90 of a value $r$ and a charging member 92 of constant current $I_o$. It will be apparent that the output voltage applied to the indicator 80 is:

$$rI_o \frac{T}{d}$$

A switch 94 is opened only during the checking periods which will now be explained. During these short periods (50 msec.) the pulses arriving at the shaper 84 do not have any significance for the altitude of the airplane. When the switch 94 is opened, the charge of the capacitor 88 is maintained and the signal applied to the reading member 80 is kept constant, which is necessary to avoid disturbance of the altitude indication. These periods allow at the same time a check of the performance of the apparatus and, if necessary, a correction of the slow excursions. During these periods the transmitted signal is mixed at 30 with a signal derived from the signal transmitted in the apparatus and delayed by an invariable duration by passing it through a reference delay line, instead of being mixed with the echo signal from the ground, delayed by the invariable duration of the double travel. This is achieved by means of the following members: a counter 96 receiving the pulses from the discriminator 10 and supplying a short output pulse for every 20 input pulses. Each of these output pulses initiates by means of a programmer 97 the changeover from a measuring period to a checking period or conversely. This programmer controls various switches, the operation of which are described above or will be described below for the initiation of the check, that is to say at the end of a measuring period.

The capacitor 88 stores the output voltage of the periodometer 76 by the opening of the switch 94, whilst the same applies to the periodometer 78.

The control-loop is opened by opening the switch 54 by means of the circuit 68.

The capacitor 62 stores, by the opening of the switch 64, the error signal from the amplifier 58, corresponding to the normal measurement of the altitude of the plane.

Instead of said error signal, the voltage across the capacitor 70 is introduced into the loop by the closure of the switch 72. This voltage has been stored during the preceding checking period.

The transmission signal is applied from the doubler 22 to the filter 28 through the delay line 102 formed by a delay line and an attenuator 104 with the aid of two circulators 106 and 108, controlled by the windings 110 and 112. These circulators operating on ultra-high frequencies are generally known. They are formed by ferrites arranged in wave guides and are controlled by the continuous magnetic field applied thereto. By this application the aerials 24 and 26 are put out of circuit, whilst the external path of the signal of variable duration (outward path to the ground and backward path to the aerial 26) is replaced by an internal path through the line 102, which delays the signal by a well defined period of time $\tau_o = 0.058$ $\mu$sec., so that the measuring members can be checked by these delays.

The circuit 97 closes again the switch 54 2 msec. after having received the instruction for opening it, which delay is required for the stabilization of the circuits. The control-loop is then closed again and operates as before but for the variable delay $\tau$, which is replaced by the invariable delay $\tau_o$. The period T of the sawtooth then has in principle a value $$T_o = \frac{2S_o K_2 \tau_o}{f_o}$$

which is well defined.

By closing a switch 98 a checking frequency meter is put into circuit for receiving the calibrated pulses from the shaper 84. This checking frequency meter is simply an integrating circuit formed by a resistor 99 and a capacitor 100.

The purpose of checking is to verify whether T really assumes said value and if it does not, to modify S so that the excursions to which the assessed difference is due are compensated. For this purpose the output voltage of the frequency meter 99—100 is applied to the input of a voltage comparison member 114, the other input of which is connected to an intermediate tapping of a resistance bridge 116 fed by the same direct voltage $V_o$ as the shaper 84. The potential of said intermediate tapping is therefore $kV_o$, wherein $k$ is an unvariable number lower than unity. This number is chosen during manufacture of the apparatus so that, when all members of the apparatus operate accurately according to the design, the output signal of the comparing member 114 is zero. If deviations appear, the comparison member supplies an error signal equal to the difference between the output signal of the frequency meter 99-100 and the reference potential $kV_o$. This error signal is amplified at 117 and applied to a control-terminal of the threshold 12, which acts upon the output voltage S thereof in a sense such that said error signal is annulled. The control-loop for the threshold voltage S thus obtained maintains the period T at the predetermined value $T_o$ during the checking periods. Beyond said periods the opening of the switch 98 and the memory store formed by the capacitor 100 maintain the error signal from the comparison member 114 and hence the threshold voltage S at the values attained during the preceding checking period. The voltage S is controlled intermittently. It should be noted that it deviates little from the theoretical value $S_o$ because the deviations occurring in the members of the controlloop of the period T remain limited and vary very slowly.

The output signal of the comparison member 114 also permits of actuating the alarm by means of a connection indicated by the arrow 118 if its value becomes too high (which corresponds to a difference of more than 5 percent between the two input signals). This comparison member is, in practice, not different from the amplifier 117, the assembly forming, as is known, a differential amplifier whose input impedance is sufficiently high for the capacitor 100 not to be discharged practically during the measuring periods.

At the termination of 20 sawtooth periods, that is to say after a duration of $20T_o$, the checking period terminates by the supply of a new pulse from the counter 96 to the programmer 97. The latter resets the apparatus to the position for measuring the altitude. The switch 98 is opened as well as the switch 54, the circulators 106 and 108 put the delay line 102 out of circuit and the aerials 24 and 26 into circuit, the switch 72 is opened, the switch 64 is closed, the circuit 68 closes the switch 54 again 2 msec. after having received the instruction to open it and finally the switch 94 is again closed. The apparatus then measures again the altitude of the airplane with a precision independent of the deviations of most of the members, because these deviations are automatically neutralised by the modification of the threshold voltage S during the checking periods. Only the deviations of the periodometer 76 or of the reading member 80 are not compensated for. For this reason two periodometers 76 and 78 are employed simultaneously. The effect of the control of the threshold voltage S is, in fact, the establishment of equality during the checking periods:

$$V_o d\frac{1}{T} = kV_o$$

whereas the control-loop of T provides the equation: $Tf_o = 2 S k_2 \tau_o$,
from which T is derived by elimination:
$df_o = 2 k S K_2 \tau_o$.

All these magnitudes have been defined above. This relation is obtained during the checking periods, but it remains valid during the measuring periods, since on the one hand any deviations of $K_2$ and $f_o$ are slow, which means that these magnitudes do not have the time to vary appreciably between the end of a checking period and the end of the consecutive measuring period and since on the other hand, as stated above, S maintains during a measuring period the value obtained during the preceding checking period, whilst the magnitudes $d$, $k$ and $\tau_o$ may be considered to be unvariable. This equality permits of eliminating during the measuring periods the slow variations or deviations of the magnitudes S, $K_2$ and $f_o$. During these periods the control-loop of T provides the equality:

$Tf_o = 2SK_2 \tau$, which provides in combination with the former equation:

$$\frac{T}{d} = \frac{1}{k} \frac{\tau}{\tau_o}$$

It is the ratio $T/\alpha$, which is measured by the periodometer 76 and the latter equation shows that only variations of $k$ or of $\tau_o$ could modify the relationship of proportionality existing between this ratio and the duration $\tau$, which is measured. Now $k$ is a ratio between resistances and $\tau_o$ is the delay of the delay line and these two magnitudes can be easily rendered unvariable with certainty. It is also fairly easy to render the duration $d$ unvariable. In practice, of course, other sources of errors may appear, for example, if the linearity of the triangular wave generator 2 or that of the oscillator 14 depend upon the period T. Nevertheless the device described permits of eliminating readily the principal causes of errors.

It is stated above that, when the detector 44 or 52 supplies a signal exceeding the limits compatible with a normal operation of the apparatus during a period longer than half a second, the circuit 50 opens the control-loop of the period T and ignites a searching system. This may occur during the start of the apparatus, since the loop is not yet connected. The period T differs too much from the value due for the output signal of the detector 52 to be significant. This may also occur when the signal received by the aerial 26 disappears or is suppressed by intense parasitic signals or when the altitude to be measured varies abruptly by a very high value. It is then necessary not to have the loop operate on signals lacking significance and to reconnect it to the useful signal as soon as possible after the reappearance of said signal.

In fact, the circuit 50 opens the switches 54 and 64, closes the switch 120, which connects a scanning voltage generator 122 to the input of the anamorphoser 74 and ignites this generator which then supplies a signal increasing linearly from a minimum to a maximum (nonsymmetrical sawtooth). This scanning signal replaces in the control-loop of T the error signal from the amplifier 58. The minimum and maximum thereof correspond with the minimum and maximum of T. After the ignition the signal increases until the loop is again in circuit, which becomes manifest by the appearance of normal signals at the outputs of the detectors 52 and 44. The circuit 50 then opens immediately the switch 120 and closes the switch 64 and finally the switch 54, so that the control-loop is completed.

It is stated that the signal supplied by the scanning voltage generator 122 increases linearly. However, the corresponding variation of the period T during the searching period is exponential, since this signal is applied to the triangular-wave generator 2 only through the nonlinear element 74. This arrangement of the radio altimeter according to the invention is related to said importance of reconnecting the control-loop of T within the shortest possible delay. For this purpose the scanning signal has to rise as quickly as possible, that is to say, its flank has to be augmented. However, the steeper is this flank, the greater is the rate of decrease $df_b/dt$ of the spectrum of the differential beat signal supplied by the mixer 30. If this rate of decrease is too great, the assembly of the circuits terminating in the detectors 44 and 52 does not have the time to react when T attains its correct value so that the control-loop of T is not reconnected. The maximum rate of decrease of the spectrum at which reconnection occurs is obtained when T passes through its correct value and will be designated by A. This rate $df_b/dt$ is represented by a negative number when T increases, since then $f_b$ decreases.

The searching delay will then be shortened as much as possible when the following equation is constantly verified during searching:

$$\frac{df_b}{dt} = A$$

It is known that the frequency $f_b$ is constantly defined by the equation:

$T f_b = 4\Delta f \tau$ and that the value of T allowing the reconnection corresponds to the equation:

$f_b = o$, that is to say:

$Tf_o = 4\Delta fav$.

From these equations can be mathematically derived easily by integration the trend of variation of T which minimizes the searching delay:

$$T = T_{\min}. \exp \frac{A}{f_o}$$

This exponential law is approximately obtained by the association of the generator 122 which supplies a linearly increasing signal, and of the nonlinear element 74, which transforms this linear increase into an exponential increase. This nonlinear element thus allows of optimizing the stabilization of the control-loop of T during the measuring periods and, in addition, of minimizing the searching delay.

I claim:

1. An altimeter comprising, signal generating means, means for producing a triangular wave of given amplitude and variable frequency, means for modulating said signal by said wave, means for programming periods of time to calibrate circuit parameters between operating periods of time for measuring the distance of a target, transmitting means for radiating the modulated signal to the target during measuring periods, receiving means for providing echo signals from the radiated signal reflected back from the target during the measuring periods, comparing means for producing a delayed modulated signal during calibration periods thereby to provide signals representing reflected signals of a known range, symmetrical mixer means for combining a portion of said modulating signal with the echo return signals during the measuring periods, and with said delayed signals during the calibration periods to provide frequency difference signals, signal processing means connected to the mixer means for providing error signals proportional to the difference between the frequency difference signals and a predetermined frequency signal, nonlinear feedback control means using the error signals for controlling the triangular wave generating means thereby to vary the frequency thereof in a sense to reduce the difference between said frequency difference signals, discriminator means for comparing the amplitudes of the output waveform of said triangular wave generating means and of a threshold level and producing output pulses when the threshold level is exceeded, linear feedback means using said output pulses of said discriminator means for controlling the amplitude of the waveform of said triangular wave generator, pulse shaping means for providing square waves at a frequency determined by the frequency of said output pulses of said discriminator means, measuring means for determining the range of the target from the periods of the square waves during the measuring period, and correcting means for adjusting the threshold level of the discriminator means to compensate for undesired amplitude variations of tee output waveform of the triangular wave generating means during the calibration period and maintaining the threshold level at the calibrated value during the measuring period.

2. An altimeter as claimed in claim 1, wherein the correcting means comprise programming means for initiating and terminating the calibration periods, integrating means for providing calibrated voltages from the pulse shaping means during the calibration periods, comparator means for comparing the calibrated voltages with a reference voltage to provide threshold error signals during the calibration period, threshold control means for adjusting the threshold level of the discriminator means with said error signals, and memory means for maintaining the threshold level of the discriminator means at the adjusted value during the measuring periods.

3. An altimeter as claimed in claim 1, wherein the signal processing means comprise filter means for eliminating frequencies above and below frequency bandwidths centered at the predetermined frequency signal, clipping means for minimizing parasitic signals from the filter means, and detecting means for comparing the powers of the signal spectrum above and below the frequencies of the frequency difference signal to produce error signals proportional to the spectrum power difference.

4. An altimeter as claimed in claim 1 wherein the nonlinear feedback control means comprise switching means controlled by the correcting means to interrupt the feedback control means during transitional periods between the calibration and measuring periods, integrating means for providing control voltages from the error signals during the measuring periods and calibrated control voltages during the calibration periods, and a nonlinear quadripole network, having an output voltage for controlling said triangular wave generating means that varies exponentially as a function of the output of the integrating means.

5. An altimeter as claimed in claim 1 further comprising monitoring means for interrupting the nonlinear feedback control means when the spectrum power difference above and below the frequencies of the frequency difference signal deviates from predetermined power levels, and scanning voltage generating means for providing control voltages to correct said spectrum power deviations and return the nonlinear feedback control means to a closed loop condition.